United States Patent [19]
Geck

[11] Patent Number: 5,960,059
[45] Date of Patent: Sep. 28, 1999

[54] METHOD FOR THE ACTIVATION OF COMMUNICATIONS TERMINAL EQUIPMENT UPON NETWORK-MANAGEMENT-SPECIFIC EVENTS

[75] Inventor: Bertram Geck, Schwerte, Germany

[73] Assignee: Siemens Aktiengesellschaft, Munich, Germany

[21] Appl. No.: 08/691,533

[22] Filed: Aug. 2, 1996

[30] Foreign Application Priority Data

Aug. 10, 1995 [DE] Germany ............... 195 29 495

[51] Int. Cl.$^6$ ............... H04M 1/24; H04M 11/04
[52] U.S. Cl. ............... 379/10; 379/32; 379/34; 379/40
[58] Field of Search ............... 379/1, 10, 15, 379/27, 29, 32, 33, 34, 35, 42, 45, 36, 37, 38, 39, 40, 50

[56] References Cited

U.S. PATENT DOCUMENTS 3,937,889  2/1976  Bell, III et al. ............... 379/37
5,426,688  6/1995  Anand ............... 379/5
5,596,623  1/1997  Uchiba et al. ............... 379/15
5,687,212  11/1997  Kinser, Jr. et al. ............... 379/15

FOREIGN PATENT DOCUMENTS 43 31 053 A1  3/1994  Germany.

*Primary Examiner*—Paul Loomis
*Attorney, Agent, or Firm*—Hill & Simpson

[57] ABSTRACT

In a method for the activation of communications terminal equipment upon network-management-specific events, predetermined events occurring in a network management system (e.g. an error message) are acquired in network management routines and are signaled to a network management central station. In this station, a call number information of a public or private telephone network is allocated to each event by means of which information the communications terminal equipment of the responsible party or the party to the call is determined for the respective event. After the signaling of a predetermined event, the allocated call number information is determined, and by means of a dialing apparatus a connection to the communications terminal equipment designated by the determined call number information is set up via the communications network.

6 Claims, 1 Drawing Sheet

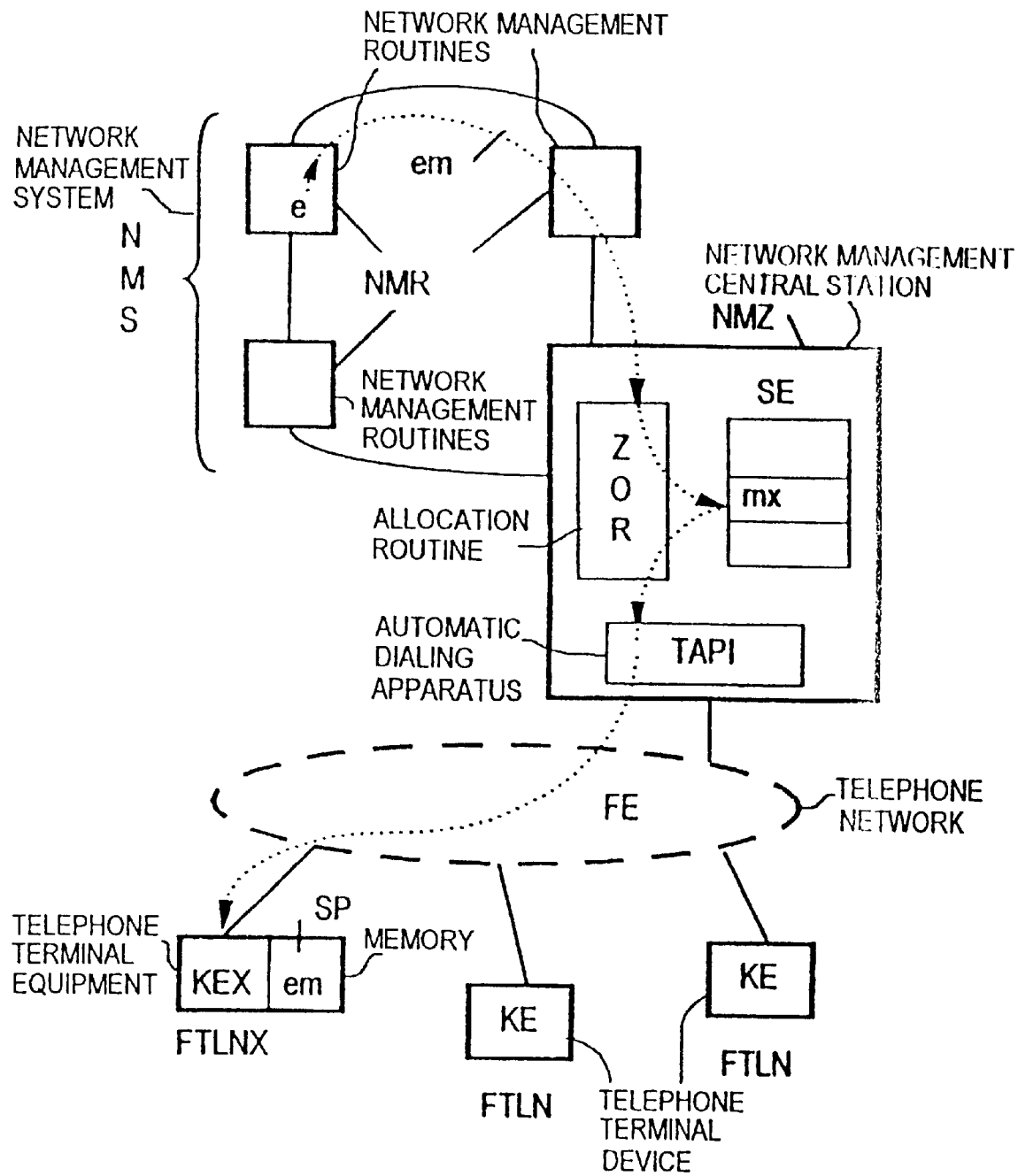

METHOD FOR THE ACTIVATION OF COMMUNICATIONS TERMINAL EQUIPMENT UPON NETWORK-MANAGEMENT-SPECIFIC EVENTS

BACKGROUND OF THE INVENTION

In currently designed communications networks—local, private or public—network management routines are provided by means of which the topology of a communications network (e.g. of a personal computer network) can automatically be recognized and stored. Furthermore, for every recognized communications network component (e.g. network server or central communications station), information is stored that indicates the location thereof and its topological locus in the communications network.

If a predetermined event occurs in the communications network (e.g. an error or disturbance message of a communications network component), the event is signaled to a central management station, and the occurrent event is acquired by an operator at a central management station provided with operating personnel (e.g. through the visual representation of the event); the party to the call or name of the responsible party is determined; and an activation occurs of the responsible party or the party to the call. The call number information of the responsible party is determined by the operator, and the determined call number information is typed into an auxiliary telephone apparatus by means of which a connection to the communications terminal equipment of the responsible party or the party to the call is created.

SUMMARY OF THE INVENTION

An object of the invention is to simplify the activation of the party to the call or the responsible party. This object is solved on the basis of a method according to the invention for activation of communication terminal equipment in a communications network in which predetermined, network-management-specific events of a network management system of one of allocated network management routines are signaled. The events are signaled through event messages of a network management central station. The allocated communications terminal equipment is activated via the communications network in dependence on the signaled event. In the network management central station, a call number information that determines the communications terminal equipment to be activated is allocated for each predetermined event by means of an allocation routine. After the signaling of a predetermined event, the allocated call number information is determined. The connection to a communications terminal equipment designated by the determined call number information is set up via the communications network by means of a dialing apparatus.

An essential aspect of the method of the invention is that in the network management central station a call number information determining the communications terminal equipment to be activated is allocated for each predetermined event. After the signaling of a predetermined event, the allocated call number is determined by the allocated network management routine, and, by means of the dialing apparatus, a connection is set up via the communications network according to the determined call number information. The essential advantage of the method of the invention is that the operator is relieved of the burden of extensive determination activities, i.e. a connection to the communications terminal equipment of the party to the call or the responsible party is set up with the most minimal time expenditure.

According to an advantageous development of the method of the invention, the connection to the communications terminal equipment designated by the determined call number information is automatically set up by means of the allocation routine (ZOR) and the dialing apparatus. In this situation, the operator can be dispensed with. In order to ensure the activation of the respective party to the call, the connection setup is set up to a memory, i.e. "mailbox," of the respective communications terminal equipment, and a pointer or flag information (e.g. the event information). By this means, an activation (which is indeed subsequent but nonetheless takes place as soon as possible) of the relevant party to the call, or the responsible party is achieved.

The predetermined events represent, in particular, error and disturbance messages of the individual communications network components. Given these events in a communications network, the immediate activation of the communications terminal equipment, or the responsible party, is particularly advantageous.

BRIEF DESCRIPTION OF THE DRAWINGS

The drawing illustrates in block diagram format the method of the invention for activation of communications terminal equipment.

DESCRIPTION OF THE PREFERRED EMBODIMENTS

In the following, the method of the invention is explained in more detail on the basis of a block diagram. The block diagram shows a network management system NMS that comprises the network management routines NMR. By means of these network management routines NMR, events e are acquired, and are signaled to a network management platform or to a network management central station NMZ by means of the transmission of an event message em. The transmission occurs in dependence on the present communications network, controlled by the network management system NMS. In the network management central station NMZ there is stored, for each event e occurring in the respective network, or for each transmitted event message em, a telephone call number rnx of that telephone subscriber FTLNX representing the responsible party to the call or the responsible party for the communications network element in which the event e occurred or the event message em was formed.

If an event message em enters the network management central station NMZ, the allocated call number rnx is determined and is visually displayed, e.g. on a personal computer. After a simple initialization at the user interface of the personal computer (e.g. by means of a cursor control) the call number rnx is automatically dialed, and a connection setup to the telephone terminal equipment KEX designated by the call number rnx is introduced. For this purpose, in the network management central station NMZ an automatic dialing apparatus TAPI is implemented for a telephone network FE, to which network are connected further telephone terminal devices KE, respectively connected to a subscriber FTLN. The automatically dialed call number rnx is transmitted to the automatic dialing apparatus for the purpose of a connection setup. Alternatively, the connection can be set up via public or private telephone networks (not shown). Alternatively, the initialization of the connection setup in the network management central station NMZ can occur either automatically, after a transmission of an event message em, or, as previously stated, through an operator, by means of an event at the user interface of the network management central is station NMZ, e.g. by means of a keystroke or a cursor control. If the telephone terminal equipment KEX designated by the call number information rni is not reachable, the event message em is transmitted, by means of the automatic dialing apparatus TAPI, into a memory SP of the designated telephone terminal equipment KEX, which memory realizes a "mailbox" function. The message is stored there, and the storing is acoustically and/or optically displayed.

Although various minor changes and modifications might be proposed by those skilled in the art, it will be understood that my wish is to include within the claims of the patent warranted hereon all such changes and modifications as reasonably come within my contribution to the art.

I claim as my invention:

1. A method for activation of communications terminal equipment in a communications network wherein predetermined, network-management-specific events of a network management system of one of allocated network management routines are signaled, and wherein the events are signaled through event messages of a network management central station, and the allocated communications terminal equipment is activated via the communications network in dependence on the signaled event, comprising the steps of:

in the network management central station, allocating for each predetermined event by means of an allocation routine, a call number information that determines the communications terminal equipment to be activated so that different call number information is allocated to different events and for different events, different communications terminal equipment is to be activated;

after the signaling of a predetermined event, determining the allocated call number information; and setting up a connection to the communications terminal equipment designated by the determined call number information via the communications network by means of a dialing apparatus.

2. A method according to claim 1, wherein by means of the allocation routine and the dialing apparatus, the connection is automatically set up to the communications terminal equipment designated by the determined call number information.

3. A method according to claim 2, wherein a connection is set up to the communications terminal equipment designated by the indicated call number information, and the event message is transmitted into a memory allocated to the communications terminal equipment.

4. A method according to claim 1 wherein by means of the allocation routine and the dialing apparatus, the event information and the determined call number information are visually displayed, and, after a user-interface-controlled initialization, the connection to the communications terminal equipment designated by the determined call number information is automatically set up.

5. A method according to claim 1 wherein the predetermined events represent information indicating a breakdown or a disturbance of communications network components.

6. A method according to claim 1 wherein by means of the call number information, the communications terminal equipment is determined whose subscriber is intended as a party to the call or a responsible party for a respective network component.

* * * * *